(12) United States Patent
Herloski et al.

(10) Patent No.: US 7,467,879 B2
(45) Date of Patent: Dec. 23, 2008

(54) DOCUMENT ILLUMINATOR WITH STEPPED OPTICAL ELEMENT

(75) Inventors: Robert P. Herloski, Webster, NY (US); Jagdish C. Tandon, Fairport, NY (US); Douglas E. Proctor, Gates, NY (US); Eric Dudley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 83 days.

(21) Appl. No.: 11/409,137

(22) Filed: Apr. 21, 2006

(65) Prior Publication Data

US 2007/0247857 A1    Oct. 25, 2007

(51) Int. Cl.
*F21V 7/00* (2006.01)

(52) U.S. Cl. .................. 362/310; 362/610

(58) Field of Classification Search .......... 362/606, 362/26; 385/147, 129; 399/211, 220, 221
See application file for complete search history.

(56) References Cited

U.S. PATENT DOCUMENTS

| | | | |
|---|---|---|---|
| 5,255,171 A | | 10/1993 | Clark |
| 5,590,945 A | * | 1/1997 | Simms ................. 362/623 |
| 6,193,383 B1 | * | 2/2001 | Onikiri et al. ........... 362/26 |
| 6,236,470 B1 | | 5/2001 | Searchman |
| 6,305,813 B1 | * | 10/2001 | Lekson et al. .......... 362/625 |
| 2003/0081275 A1 | * | 5/2003 | Shishido .............. 358/509 |
| 2004/0131157 A1 | | 7/2004 | Stevanovic et al. |
| 2005/0248959 A1 | * | 11/2005 | Chiou ................. 362/602 |
| 2005/0265684 A1 | * | 12/2005 | Nemoto et al. ......... 385/146 |

\* cited by examiner

*Primary Examiner*—Anabel M Ton
*Assistant Examiner*—Julie A Shallenberger
(74) *Attorney, Agent, or Firm*—R. Hutter

(57) ABSTRACT

An apparatus for scanning a document comprises a platen for supporting at least a portion of the document; a light source; and an optical element for directing light from the light source to the platen. The optical element defines a plurality of small planar surfaces, the small planar surfaces being arranged in a linear array. Light emanating from a source is reflected from one of the small planar surfaces and emerges substantially perpendicular to an exit surface.

7 Claims, 3 Drawing Sheets

DOCUMENT ILLUMINATOR WITH STEPPED OPTICAL ELEMENT

TECHNICAL FIELD

The present disclosure relates to illuminating apparatus used to illuminate hard-copy documents for digital recording, such as in facsimile machines and digital copiers.

BACKGROUND

In office equipment such as digital copiers and facsimile machines, original hard-copy documents are recorded as digital data using what can be generally called a "scanner." In a typical scanner, a document sheet is illuminated and the light reflected from the document sheet is recorded by a photosensitive device such as a CCD or CMOS array, to be converted to digital image data. In one embodiment, a narrow strip of the document sheet is illuminated as the sheet is moved through a document handler, or the photosensitive device is moved relative to a platen on which the document sheet is placed.

Designing an illuminator for a scanner presents challenges in providing, among other aspects, an even illumination along the narrow strip of the document, as well as providing a suitable illumination profile across the narrow strip. Irregularities in the illumination level in the illuminated area will result in defects in the image data. An overview of the art of designing illuminators for scanners is given in U.S. Pat. No. 6,236,470.

One known type of illuminator, used in various contexts, includes a light-transmissive element that exploits internal reflections to direct light from one or more point sources to emerge in substantially parallel rays from an exit surface of the element. Specifically, one known shape for this purpose is a compound parabolic concentrator, or CPC; uses of the CPC are shown in U.S. Pat. No. 5,255,171 and US Patent Application Publication 2004/0131157, now abandoned.

SUMMARY

According to one aspect, there is provided an optical element comprising a light-transmissive material of predetermined refractive index. The optical element defines a first main surface and a second main surface, together substantially forming a CPC through a section thereof; a substantially planar exit surface disposed between the first main surface and the second main surface; and a back structure opposite the exit surface. The back structure defines a plurality of small planar surfaces, arranged in a linear array. Light emanating from a source disposed between the first main surface and the second main surface is reflected from one of the small planar surfaces and emerges substantially perpendicular to the exit surface.

According to another aspect, there is provided apparatus for scanning a document, comprising a platen for supporting at least a portion of the document; a light source; and an optical element for directing light from the light source to the platen. The optical element comprises a light-transmissive material of predetermined refractive index. The optical element defines a first main surface and a second main surface, together substantially forming a CPC through a section thereof; a substantially planar exit surface disposed between the first main surface and the second main surface; and a back structure opposite the exit surface. The back structure defines a plurality of small planar surfaces, the small planar surfaces being arranged in a linear array. Light emanating from a point source disposed between the first main surface and the second main surface is reflected from one of the small planar surfaces and emerges substantially perpendicular to the exit surface.

DETAILED DESCRIPTION

Figure 1:
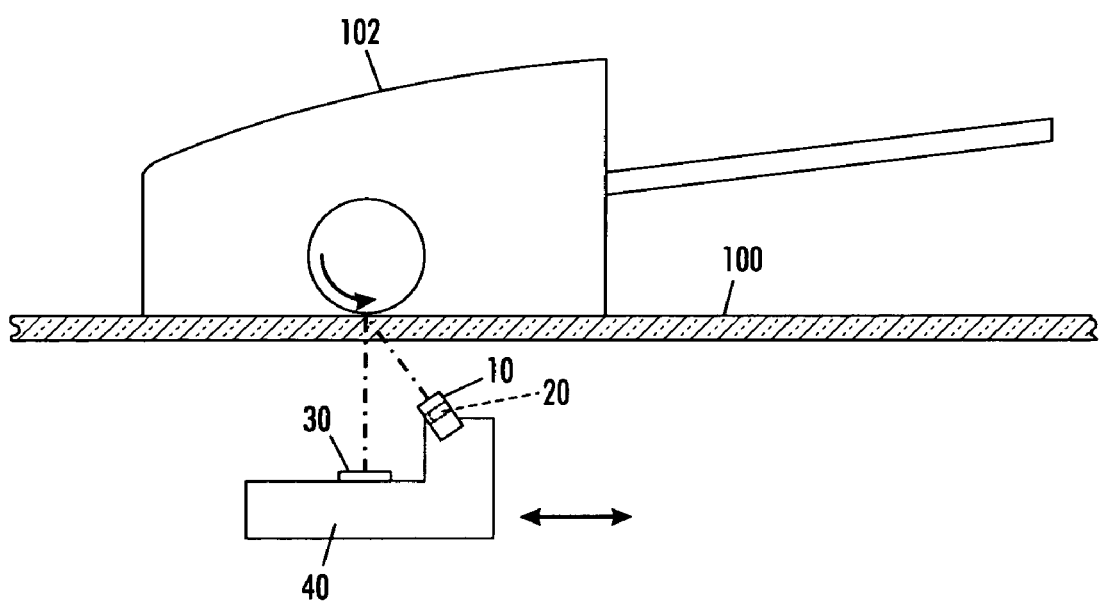
FIG. 1 is a simplified elevational view of a document scanner.

FIG. 1 is a simplified elevational view of a document scanner. There is provided a platen 100, which may have distinct parts, on which a document sheet can be placed for recording therefrom. Also associated with platen 100 is a document handler generally indicated as 102, which can be of any design known in the art. The document handler sequentially feeds sheets from a multi-page original document past a scan head comprising an illuminator including an optical element 10 and at least one light source 20, and a photosensitive device 30. The illuminator illuminates a thin strip of the document while the photosensitive device 30, which includes one or more linear arrays of photosensors, records the reflected light. (There is typically another lens, not shown, interposed between the platen 100 and the photosensitive device 30.) The scan head can be mounted on a moveable carriage 40, for recording light reflected from images on sheets placed on the main portion of platen 100. The optical element is arranged at an angle between 30 and 45 degrees relative to a surface of the document being recorded.

Figure 2:
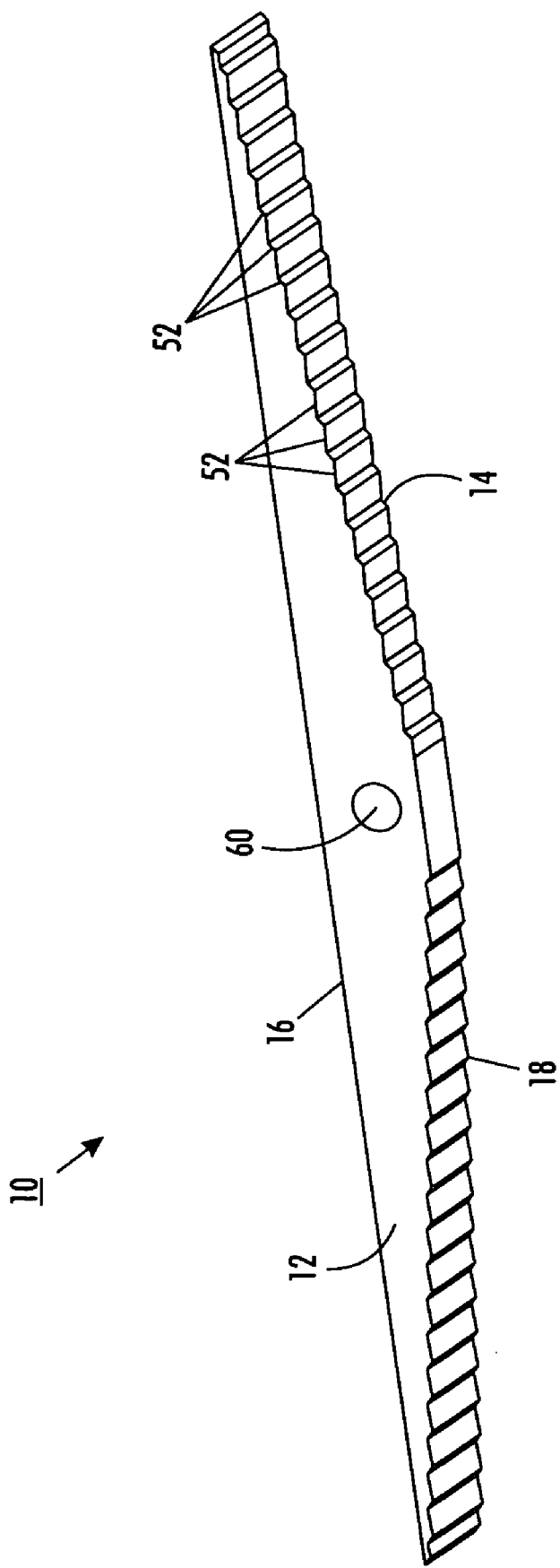
FIG. 2 is a perspective view of an optical element in isolation.

FIG. 2 is a sectional view of an optical element 10 in isolation. The optical element 10 comprises a material of predetermined refractive index. The optical element 10 defines a first main surface 12, a second main surface 14, an exit surface 16, and what is generally called a "back surface" 18. In this embodiment, the back surface 18 defines a plurality of small planar surfaces, each indicated as 50, interspersed with discontinuity surfaces 52, and generally forming an arc symmetrical relative to a centerline of the element 10. There is also defined, in at least the first main surface 12, a cavity 60 suitable for accepting a side-emitting light source, such as an LED or other point light source (the cavity 60 also be a through-hole reaching the second main surface 14).

Figure 3:
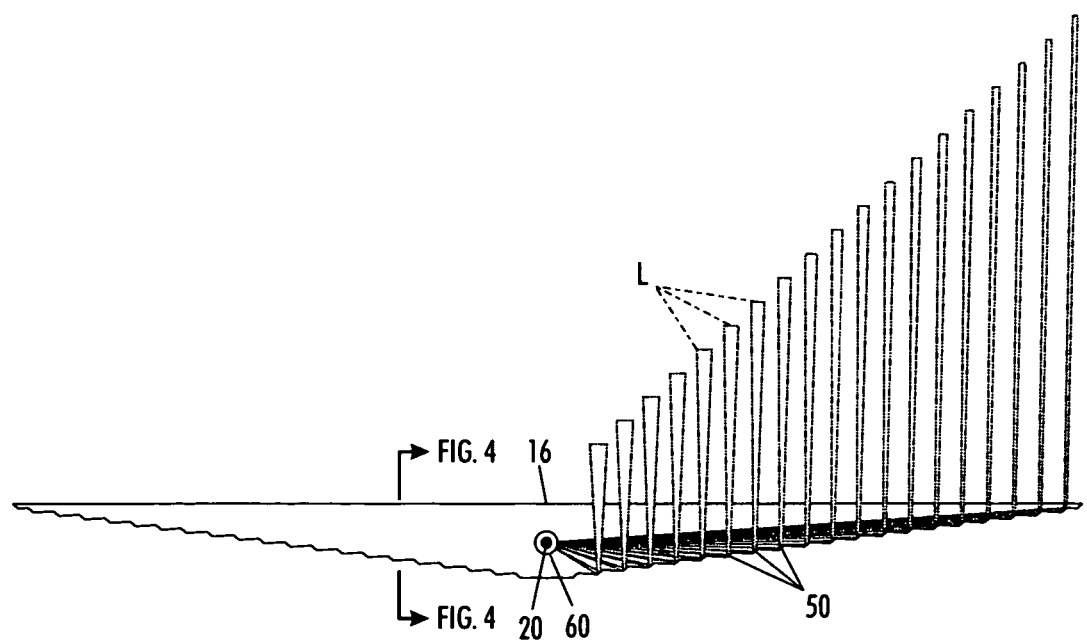
FIG. 3 is a plan view of the optical element in isolation.

FIG. 3 is a plan view of the optical element 10, showing some paths of light beams L emitted from a light source 20 disposed in cavity 60. As can be seen, each individual small planar surface 50 is configured to reflect light from cavity 60 and direct the beam so that it exits substantially perpendicularly from the exit surface 16. The overall desired effect is a substantially even distribution of light through the entire area of exit surface 16, or at least a portion extending the length of exit surface 16.

Depending on a specific implementation, each small planar surface 50 can direct the light through exit surface 16 through total internal reflection. In addition, the shape of each discontinuity surface 52 can be tailored (such as by its relative angle to adjacent surfaces) to minimize losses between adjacent small planar surfaces 50.

Figure 4:
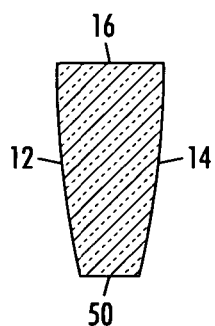
FIG. 4 is a sectional view, through line 4-4 in FIG. 3, of a portion of the optical element of FIG. 3.

FIG. 4 is a sectional view, through line 4-4 in FIG. 3, of a portion of the optical element of FIG. 3. The first main surface 12 and second main surface 14 are generally parabolic in shape, opening as shown to exit surface 16. These main surfaces 12, 14 further aid in directing light from light source 20 toward exit surface 16. In one embodiment, the parabolic surfaces generally form what is known in the art as a compound parabolic concentrator, or CPC, which exploits total internal reflection to direct light in a desired manner. In overall operation, light originating from light source 20 is reflected by each of the small planar surfaces 50 forming back surface 18 by total internal reflection. The reflected light is then directed by the substantially parabolic surfaces 12, 14 to emerge from the exit surface in a substantially collimated manner.

Because of the different lengths between a particular planar surface 50 and exit surface 16, the various cross-sections, of which the section shown in FIG. 4 is one example, may not all exhibit true CPC optical characteristics, but the generally curved shapes of surfaces 12, 14 even at the ends of the optical element are helpful in directing light in a desirable manner through exit surface 16.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An apparatus for scanning a document, comprising:
   a platen for supporting at least a portion of the document;
   a light source; and
   an optical element for directing light from the light source to the platen, the optical element including a light-transmissive material of predetermined refractive index and defining
      a first main surface and a second main surface, together substantially forming a CPC through a section thereof,
      an exit surface disposed between the first main surface and the second main surface, and
      a back structure opposite the exit surface, the back structure defining a plurality of small planar surfaces generally forming an arc, the small planar surfaces being arranged in a linear array, whereby light emanating from a source disposed between the first main surface and the second main surface and between the back structure and the exit surface is reflected from one of the small planar surfaces and directed to emerge substantially perpendicular to the exit surface, and
      a cavity in the first main surface, the cavity disposed substantially at a centerline of the arc of the back structure, the light source being disposed in the cavity.

2. The apparatus of claim 1, each small planar surface in the optical element causing reflection by total internal reflection.

3. The apparatus of claim 1, the optical element further defining discontinuity surfaces disposed between adjacent small planar surfaces.

4. The apparatus of claim 1, the small planar surfaces in the back structure of the optical element substantially defining an arc.

5. The apparatus of claim 4, the back surface of the optical element being substantially symmetrical relative to an axis passing through a substantial midpoint of the exit surface.

6. The apparatus of claim 1, the cavity being located along an axis passing through a substantial midpoint of the exit surface.

7. The apparatus of claim 1, the optical element and the light source being disposed on a movable carriage.

\* \* \* \* \*